US012099320B2

(12) United States Patent
McDaniel et al.

(10) Patent No.: US 12,099,320 B2
(45) Date of Patent: Sep. 24, 2024

(54) PHYSICAL INDICATORS OF PRINT MATERIAL REFILL CONTAINERS

(71) Applicant: Hewlett-Packard Development Company, L.P., Spring, TX (US)

(72) Inventors: Gabriel Scott McDaniel, Boise, ID (US); Paul L. Jeran, Boise, ID (US); Jeffrey Harold Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/273,009

(22) PCT Filed: Jan. 22, 2021

(86) PCT No.: PCT/US2021/014493

§ 371 (c)(1),
(2) Date: Jul. 18, 2023

(87) PCT Pub. No.: WO2022/159091

PCT Pub. Date: Jul. 28, 2022

(65) Prior Publication Data

US 2024/0094670 A1 Mar. 21, 2024

(51) Int. Cl.
*G03G 15/08* (2006.01)
*B41J 2/175* (2006.01)
*G03G 15/00* (2006.01)

(52) U.S. Cl.
CPC ........ *G03G 15/553* (2013.01); *B41J 2/17509* (2013.01); *G03G 15/0863* (2013.01); *G03G 2215/0695* (2013.01)

(58) Field of Classification Search
CPC ............ G03G 15/0863; G03G 15/553; G03G 2215/0695; B41J 2/17509; B41J 2/17506
See application file for complete search history.

(56) References Cited

U.S. PATENT DOCUMENTS

| | | | |
|---|---|---|---|
| 5,530,521 | A | 6/1996 | Lee |
| 6,301,449 | B1 | 10/2001 | Miura |
| 2021/0200119 | A1 | 7/2021 | Lim |

FOREIGN PATENT DOCUMENTS

| | | | | |
|---|---|---|---|---|
| EP | 1578606 B1 | | 11/2011 | |
| EP | 3039615 B1 | * | 7/2019 | .......... B41J 2/17546 |
| JP | 02-258274 A | | 10/1990 | |
| JP | 2017-068425 A | | 4/2017 | |
| KR | 10-2020-0004613 A | | 1/2020 | |
| WO | 2019/208874 A1 | | 10/2019 | |
| WO | 2020/046417 A1 | | 3/2020 | |

* cited by examiner

*Primary Examiner* — Sophia S Chen
(74) *Attorney, Agent, or Firm* — Foley & Lardner LLP

(57) ABSTRACT

A print material refill container includes a housing and a chamber, within the housing, to contain a print material. The print material refill container includes a physical indicator subject to modification based on an engagement of the physical indicator with an engagement member of a printing device when the print material refill container engages the printing device to deliver the print material to a reservoir of the printing device. The physical indicator indicates an unused condition of the print material refill container when the physical indicator has a first state prior to the modification, and the physical indicator indicates a used condition of the print material refill container when the physical indicator has a second state subsequent to the modification.

13 Claims, 6 Drawing Sheets

PHYSICAL INDICATORS OF PRINT MATERIAL REFILL CONTAINERS

CROSS-REFERENCE TO RELATED APPLICATIONS

This application is a U.S. National Stage Patent Application under 35 U.S.C. § 371 of PCT/US2021/014493, filed Jan. 22, 2021, which is hereby incorporated by reference in its entirety.

BACKGROUND

A printing device can deliver a print material to a print medium to form an image on the print medium. In some examples, a printing device can be an electrophotographic printing device that supplies a toner (which is a type of print material) to an electrostatic latent image formed on a photoconductor to form a visible toner image on the photoconductor. The electrophotographic printing device transfers the toner image to a print medium, and then fixes the transferred toner image to the print medium, to form an image on the print medium.

In other examples, other types of printing devices can employ other types of print materials. For example, a printing device can employ ink that is delivered to a print medium to form an image on the print medium. In further examples, a printing device can be a three-dimensional (3D) printing device, also referred to as an additive manufacturing machine that builds 3D objects on a layer-by-layer basis. In processing each layer of build material used in forming a 3D object, the 3D printing device can supply a liquid print agent to the layer. The liquid print agent is a form of print material.

BRIEF DESCRIPTION OF THE DRAWINGS

Some implementations of the present disclosure are described with respect to the following figures.

Figure 1:
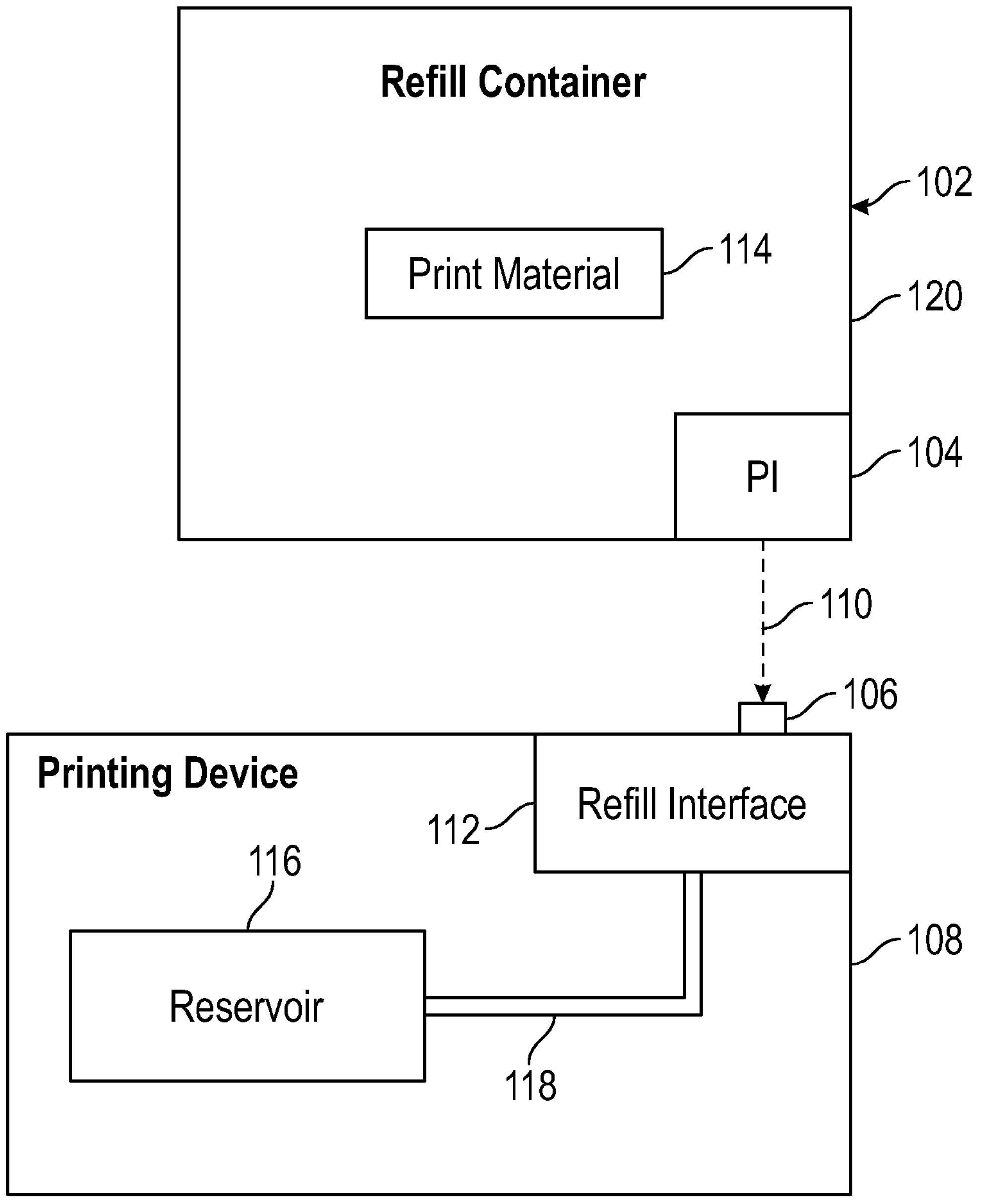
FIG. 1 is a block diagram of an arrangement including a print material refill container and a printing device, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A printing device can include a reservoir to hold a print material. The reservoir can be in the form of any type of space within the printing device in which a print material can be stored until the print material is delivered for use in a print operation. In some examples, the reservoir may be in the form of a cartridge that is attached inside the printing device. The cartridge may be fixedly or removably attached to the printing device. In other examples, other types of reservoirs can be used in printing devices.

The reservoir of the printing device can be refilled with a print material when the supply of the print material in the reservoir is exhausted or falls below a threshold. In examples where the reservoir of the printing device is in the form of a removable cartridge, the ability to refill the cartridge with a print material multiple times can increase the useful life of the cartridge and reduce the cost associated with using the cartridge. The refillable cartridge can be refilled multiple times before having to be replaced by removal from the printing device and replacement with a new cartridge.

The reservoir in the printing device can be refilled using a print material refill container. The refill container includes a housing and a chamber within the housing that contains the print material. The refill container can engage a refill interface of a printing device, at which point a user can actuate a refill actuator of the refill container, to deliver the print material in the refill container to the reservoir of the printing device.

In some cases, the refill container is a one-time use refill container, in which the refill container is to be used just once and then discarded or returned to a vendor of the refill container for recycling.

Unauthorized suppliers may attempt to supply unauthorized refill containers. A refill container is unauthorized for use with a printing device if a vendor of the printing device has not authorized use of the refill container. A supplier is unauthorized if the supplier is not an entity that the vendor of the printing device has approved to supply refill containers. As an example, the vendor of printing devices may specify that printing devices are to be refilled with refill containers supplied by the vendor and/or by designated third-party supplier(s). Any refill container not from the vendor or a designated third-party supplier is considered unauthorized.

An unauthorized refill container may be one made by an unauthorized supplier or may be a refill container from the vendor or a designated supplier that was previously used and subsequently refilled by the unauthorized supplier.

To prevent use of unauthorized refill containers, a printing device may include an authentication mechanism to verify that a refill container that is being used to refill the printing device is authentic, prior to accepting a print material from the refill container. In some examples, a refill container may include a memory device that stores information that can be accessed by the printing device and used for authenticating the refill container by the printing device. The memory device can be in the form of an electronic memory tag or any other type of non-volatile memory device.

However, a memory device and associated electronic circuitry may add to the cost of a refill container or may not be feasible. Therefore, in some cases, lower cost refill containers may not include memory devices and associated electronic circuitry. For such refill containers, authentication based on accessing information stored in memory devices of the refill containers is not available.

In accordance with some implementations of the present disclosure, instead of using techniques or mechanisms that rely on electronic access of information stored in a memory device of a refill container, a print material refill container 102 (as shown in FIG. 1) can be provided with a physical indicator 104. The physical indicator 104 is subject to modification based on a physical engagement of the physical indicator 104 with an engagement member 106 of a printing device 108 when the refill container 102 is brought into engagement (at 110) with a refill interface 112 of the printing device 108.

The engagement member 106 can include a protrusion (e.g., a bump), a needle, or any other type of member that can physically contact the physical indicator 104 when the refill container 102 engages the refill interface 112 and a user actuates the refill container 102 to cause delivery of a print material 114 to a reservoir 116 of the printing device 108.

The print material 114 is stored within an inner chamber defined by a housing 120 of the refill container 102.

In some examples, the refill container 102 can include a plunger, a lever, a button, or any other type of actuator that can be manipulated by a user. When the actuator is actuated by the user, the print material 114 in the refill container 102 is delivered through the refill interface 112 and a conduit 118 to the reservoir 116 in the printing device 108. As a further example, the refill container 102 may have a portion that is rotatable with respect to the refill interface 112 to cause delivery of the print material 114 to the printing device 108.

The physical indicator 104 can have different states depending upon whether or not the physical indicator 104 has been engaged with the engagement member 106 of the refill interface 112 of the printing device 108. The physical indicator 104 indicates an unused condition of the refill container 102 when the physical indicator 104 has a first state prior to modification of the physical indicator 104 based on physical interaction with the engagement member 106. The physical indicator 104 indicates a used condition of the refill container 102 when the physical indicator 104 has a second state subsequent to the modification. The state of the physical indicator 104 can be detected by a printing device (the printing device 108 or another printing device) to determine if the refill container 102 was previously used, and therefore unauthorized. Also, a refill container from an unauthorized supplier may not include the physical indicator 104, which would indicate that the refill container is unauthorized.

Figure 2A:
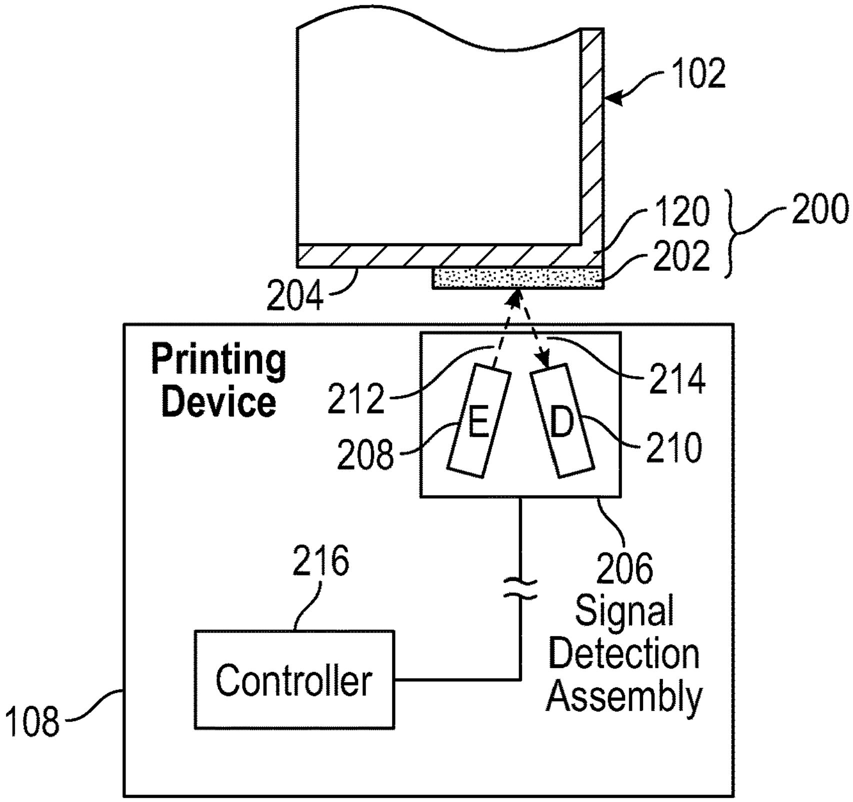
FIGS. 2A and 2B are schematic diagrams of a print material refill containers including signal-detectable physical indicators, according to some examples.

FIG. 2A shows an example arrangement that employs a signal-detectable physical indicator 200 that includes a reflective layer 202 that is attached to an outer surface 204 (e.g., a bottom surface or another surface) of the refill container housing 120. The reflective layer 202 can be in the form of a coating, for example, such as a layer of paint or a layer of another material. The reflective coating 202 can be applied to the outer surface 204 of the refill container 102 in any of various ways. For example, the reflective layer 202 can be painted onto the outer surface 204 of the refill container housing 120, the reflective layer 202 may be deposited onto the outer surface 204 of the refill container housing 120, the reflective layer 202 can be glued to the outer surface 204 of the refill container housing 120, and so forth. In other examples, the reflective layer 202 can be attached or adhered to the outer surface 204 of the refill container housing 120 in a different way.

The reflective layer 202 partially covers the outer surface 204 of the housing 120. For example, the outer surface 204 of the refill container housing 120 may be the outer surface of the refill container 102 that is to engage with the engagement member 106 of the refill interface 112 (FIG. 1). In other examples, the outer surface 204 on which the reflective layer 202 is arranged can be provided on a different side of the refill container housing 120.

The signal-detectable physical indicator 200 includes a combination of the reflective layer 202 and a portion of the outer surface 204 of the refill container housing 120. The outer surface 204 of the refill container housing 120 has a first reflectance, and the reflective layer 202 has a second reflectance that is different from the first reflectance. The "reflectance" of a surface of a material represents an effectiveness in reflecting radiant energy, such as light, an electromagnetic signal, or another type of signal.

The printing device 108 includes a signal detection assembly 206, which includes a signal emitter (E) 208 and a signal detector (D) 210. In some examples, the signal emitter (E) 208 emits a signal 212 that is directed to an area on the outer surface 204 of the refill container housing 120 where the reflective layer 202 is supposed to be provided. The signal 212 that is emitted can include light, an electromagnetic signal, or another type of signal.

When the reflective layer 202 engages with the engagement member 106 of the refill interface 112 (FIG. 1) of the printing device 108, the engagement member 106 causes a physical modification of the reflective layer 202, such as by scratching the reflective layer 202 such that a portion or an entirety of the reflective layer 202 is removed by the physical engagement with the engagement member 106.

An unused refill container 102 will have the reflective layer 202 intact, while a used refill container 102 will have a portion or an entirety of the reflective layer 202 removed.

If the signal-detectable physical indicator 200 is intact (i.e., has not been previously altered due to engagement with an engagement member of a printing device), then a reflected signal 214 (reflected in response to the emitted signal 212) from the signal-detectable physical indicator 200 will have a first characteristic (e.g., an amplitude within an expected amplitude range, a phase within an expected phase range, and so forth). The reflected signal 214 can include reflected light, a reflected electromagnetic signal, and so forth. The first characteristic of the reflected signal 214 is based on the reflectance of the reflective layer 202. The expected first characteristic may be derived based on calibration, such as performed at the factory or a different site.

However, if the signal-detectable physical indicator 200 has been altered due to prior engagement by an engagement member of a printing device, then the signal detector (D) 210 will detect a reflected signal having a second characteristic different from the first characteristic (e.g., an amplitude of the reflected signal 214 being outside of the amplitude expected range, a phase of the reflected signal 214 being outside of the expected phase range, and so forth).

The difference in characteristics of the reflected signal as detected by the signal detector (D) 210 is due to the different reflectances of the reflective layer 202 and the outer surface 204 of the refill container housing 120. If the reflective layer 202 is intact, then the reflected signal 214 will have a characteristic based on the reflectance of the reflective layer 202. However, if a portion (or an entirety) of the reflective layer 202 is removed, then the reflected signal 214 will have a characteristic based on (partially or entirely) the reflectance of the outer surface 204 of the refill container housing 120.

In some examples, the emitted signal 212 may have a characteristic to maximize a signal differential between the first characteristic of the reflected signal 214 and the second characteristic of the reflected signal 214. For example, a wavelength or other characteristic of the emitted signal 212 can be tuned such that the reflected signal 214 from the reflective layer 202 has a maximum reflectance (e.g., maximum amplitude) and the reflected signal 214 from the outer surface 204 of the refill container housing 120 has a minimum reflectance (e.g., minimum amplitude).

The printing device 108 includes a controller 216 that can receive information representing the detected reflected signal 214 from the signal detection assembly 206. The detection, by the printing device 108, of a signal (e.g., the reflected signal 214) associated with a signal-detectable physical indicator (e.g., 200) of a refill container (e.g., 102) occurs before the refill container engages with the printing device 108, to avoid a physical modification of the signal-detectable physical indicator by the engagement member of the printing device 108 that is performing the detection of whether or not the refill container 102 is unused.

The controller 216 can take an action in response to the received information. For example, if the controller 216 determines that the characteristic of the reflected signal 214 indicates that the refill container 102 is unauthorized (due to physical alteration of the reflective layer 202), the controller 216 can disable an operation of the printing device 108, such that a printing operation cannot proceed. Alternatively or additionally, the controller 216 can issue an alert to a remote entity, such as a service associated with a vendor of the printing device 108. The printing device 108 can include a communication interface (not shown) through which the controller 216 can send the alert to the remote entity over a communication network. The remote entity can take action in response to the alert. Alternatively, the raw measurement data from the signal detection assembly 206 may be sent to the remote entity.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

Figure 2B:
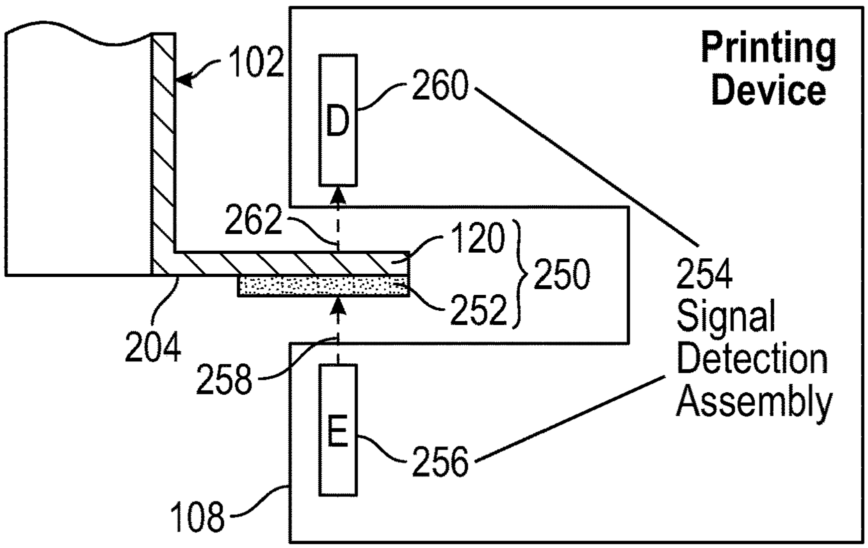

FIG. 2B illustrates a signal-detectable physical indicator 250 according to other examples. The signal-detectable physical indicator 250 includes a portion of the refill container housing 120 and a transmissive layer 252, which is attached or adhered to the outer surface 204 of the refill container housing 120. The transmissive layer 252 can be attached or adhered to the outer surface 204 of the refill container housing 120 using similar techniques as noted above for the reflective layer 202 in FIG. 2A.

The transmissive layer 252 has a first transmittance, and the refill container housing 120 (or a portion of the refill container housing 120) has a second transmittance different from the first transmittance. The "transmittance" of a material refers to an amount of a signal that can pass through the material from one side of the material to the opposite side of the material. For example, the material can be a transparent or semi-transparent material that allows light (or a portion of light) to pass through the material from one side of the material to the opposite side of the material. In other examples, the material can be non-transparent such that if the transmissive layer 252 is intact then no light is passed but if the transmissive layer 252 is removed light is allowed to pass. In other examples, transmittance can refer to transmittance of different types of signals, such as an electromagnetic signal, or another type of signal.

A signal detection assembly 254 in the printing device of FIG. 2B includes a signal emitter 256 that emits a signal 258 (e.g., light, an electromagnetic signal, etc.) towards a region of the outer surface 204 of the refill container housing 120 where the transmissive layer 252 is supposed to be provided. The signal detection assembly 254 further includes a signal detector 260 that is to detect a signal 262 passed through a segment of the refill container housing 120 (if the transmissive layer 252 has been removed) or a combination of the segment of the refill container housing 120 and the transmissive layer 252 (if the transmissive layer 252 is intact).

If the transmissive layer 252 is unaltered (i.e., has not been removed partially or entirely by engagement with an engagement member of a refill interface of a printing device), then the signal 262 detected by the signal detector 260 will have a first characteristic (e.g., having an amplitude within an expected amplitude range, a phase within an expected phase range, etc.). However, if the transmissive layer 252 has been physically altered by engagement with an engagement member of a refill interface of a printing device, then the signal detector 260 will detect the signal 262 having a second characteristic different from the first characteristic. The different characteristics are due to the fact that the unaltered transmissive layer 252 will allow a first amount of a signal to be passed through the combination of the transmissive layer 252 and the refill container housing 120. However, if the transmissive layer 252 has been altered by engagement with an engagement member of a printing device, then the detected signal 262 would be based on the transmittance of the refill container housing 120 and not on the transmittance of the transmissive layer 252 (or alternatively based on the transmittance of the refill container housing 120 and the transmittance of a partial portion of the transmissive layer 252).

The reflective layer 202 or transmissive layer 252 may have a visual indicia, such a logo including a name of a vendor of the printing device, or any other type of visual indicia. Thus, if the reflective layer 202 or transmissive layer 252 is removed (partially or completely), then the visual indicia may be modified or removed. A human would be able to detect based on absence or modification of the visual indicia that the refill container 102 has been used.

Figure 3A:
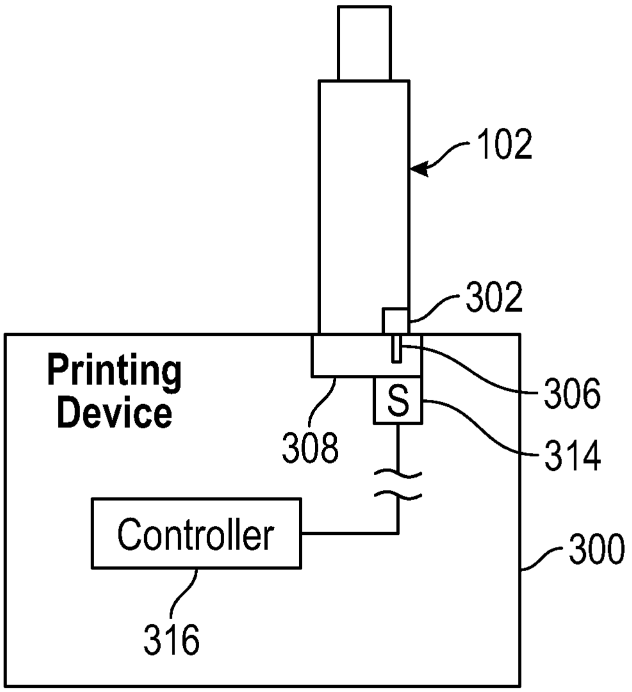
FIGS. 3A-3D and 4A-4B are schematic diagrams of print material refill containers including mechanical physical indicators, according to further examples.

FIG. 3A illustrates a different example in which the refill container 102 includes a mechanical physical indicator 302. A "mechanical physical indicator" can refer to a physical indicator that is mechanically actuatable between different positions.

Figure 3B:
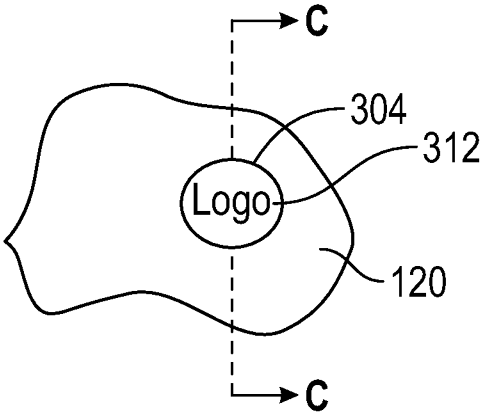
Figure 3C:
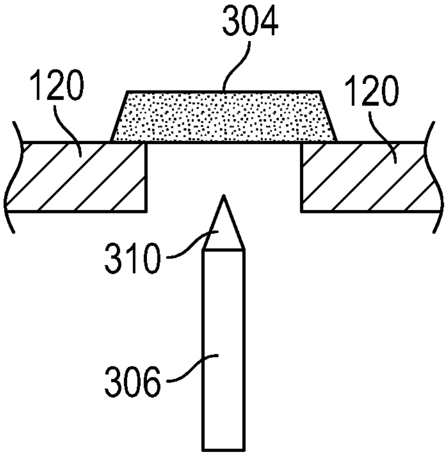

In some examples, the mechanical physical indicator 302 includes a removable insert 304 (as shown in FIGS. 3B and 3C) that is removably attached (e.g., attached by an adhesive or another attachment mechanism) to the refill container housing 120. For example, the insert 304 can be in the form of a pop-out feature or a foil that can be easily removed from the refill container housing 120 when engaged with an engagement member 306 of a refill interface 308 of a printing device 300.

The engagement member 306 can be in the form of a punch element with a tip portion 310 that pushes against a lower surface of the removable insert 304 (in the view of FIG. 3C) when the engagement member 306 moves towards and engages the removable insert 304 upon engagement of the refill container 102 with the refill interface 308 of the printing device 300.

Prior to actuation of the refill container 102 once engaged with the printing device 300, the engagement member 306 is spaced apart from the removable insert 304, such as in the position shown in FIG. 3C. When the refill container 102 is actuated by a user (e.g., the user actuating an actuator on the refill container 102 or applying a rotational or translational insertion action on the refill container 102 once engaged with the printing device 300), the engagement member 306 moves towards the removable insert 304 such that the tip portion 310 applies a force against the lower surface of the removable insert 304 and detaches the removable insert 304 from the refill container housing 120, as depicted in the view of FIG. 3D.

Figure 3D:
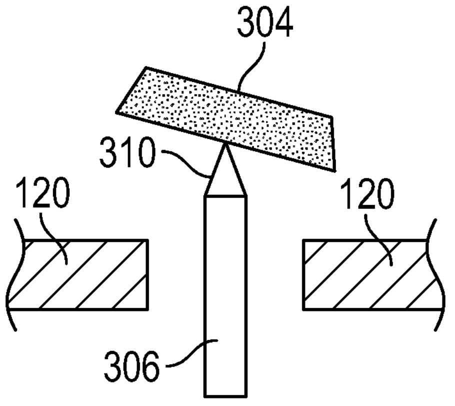

Thus, the mechanical physical indicator 302 is actuatable between two different positions: a first position as shown in FIG. 3C in which the removable insert 304 is attached to the refill container housing 120, and a second position as shown in FIG. 3D in which the removable insert 304 is detached from the refill container housing 120 and has moved away from the refill container housing 120.

FIG. 3B shows a bottom view of the outer surface of the refill container housing 120. FIG. 3C is viewed along the plane from the cross-section denoted by dotted line and arrows C. In examples according to FIG. 3B, the removable insert 304 has a logo 312, such as the logo including a name of a vendor of the printing device 300, or any other type of visual indicia.

If the removable insert 304 has been detached from the refill container housing 120 by engagement with the engagement member 306 of the refill interface 308, then the user can see that the logo 312 is not present, and thus the user can detect that the refill container 102 was previously used. Also, a partially detached removable insert 304 may create an audible or tactile indication that the user can hear or feel. On the other hand, if the removable insert 304 remains attached to the refill container housing 120, the logo 312 is visible to the user (and/or there is not an audible or tactile indication), which provides an indication to the user that the refill container 102 was not previously used. In addition, a refill container from an unauthorized supplier would not have the removable insert 304 with the logo 312; an absence of the removable insert 304 with the logo 312 provides an indication to the user that the refill container 102 is not authorized.

Moreover, the printing device 108 includes a sensor (S) 314 that can detect whether or not the removable insert 304 is present (i.e., attached to the refill container housing 120). For example, the sensor (S) 314 can be a signal sensor that can emit a signal (e.g., light or another type of signal) towards the area of the refill container housing 120 where the removable insert 304 is supposed to be. If a reflected signal reflected from the removable insert 304 is detected by the sensor (S) 314, then that provides an indication to a controller 316 of the printing device 300 that the removable insert 304 is intact and therefore the refill container 102 was not previously used. On the other hand, if the removable insert 304 is no longer attached to the refill container housing 120 due to prior engagement with an engagement member of a refill interface of a printing device, then the sensor (S) 314 will not detect a reflected signal from the removable insert 304, which provides an indication to the controller 316 that the refill container 102 was previously used.

In other examples, the sensor (S) 314 can include a force transducer, or an accelerometer, or a switch, or any other type of mechanical sensor that can detect a mechanical reaction (or lack thereof) of the engagement member 306 with the removable insert 304. For example, the mechanical sensor can detect a first force imparted by the removable insert 304 on the engagement member 306 of the refill interface 308 if the removable insert 304 is intact and attached to the refill container housing 120. On the other hand, if the removable insert 304 is detached from the refill container housing 120 due to a prior engagement with an engagement member of a printing device refill interface, then the mechanical sensor will detect a second force lower than the first force (the second force can be zero force or a force that is smaller than a specified threshold), which indicates that the refill container 102 was previously used.

In other examples, the mechanical sensor can detect accelerations associated with the removable insert 304.

Figure 4A:
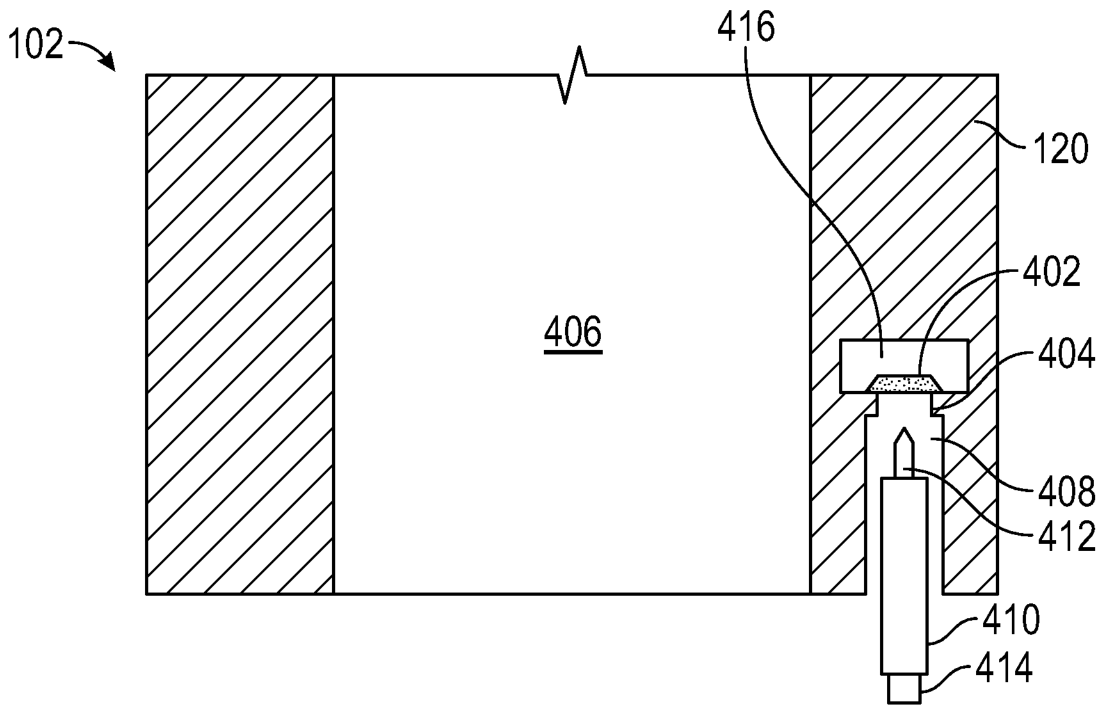
Figure 4B:
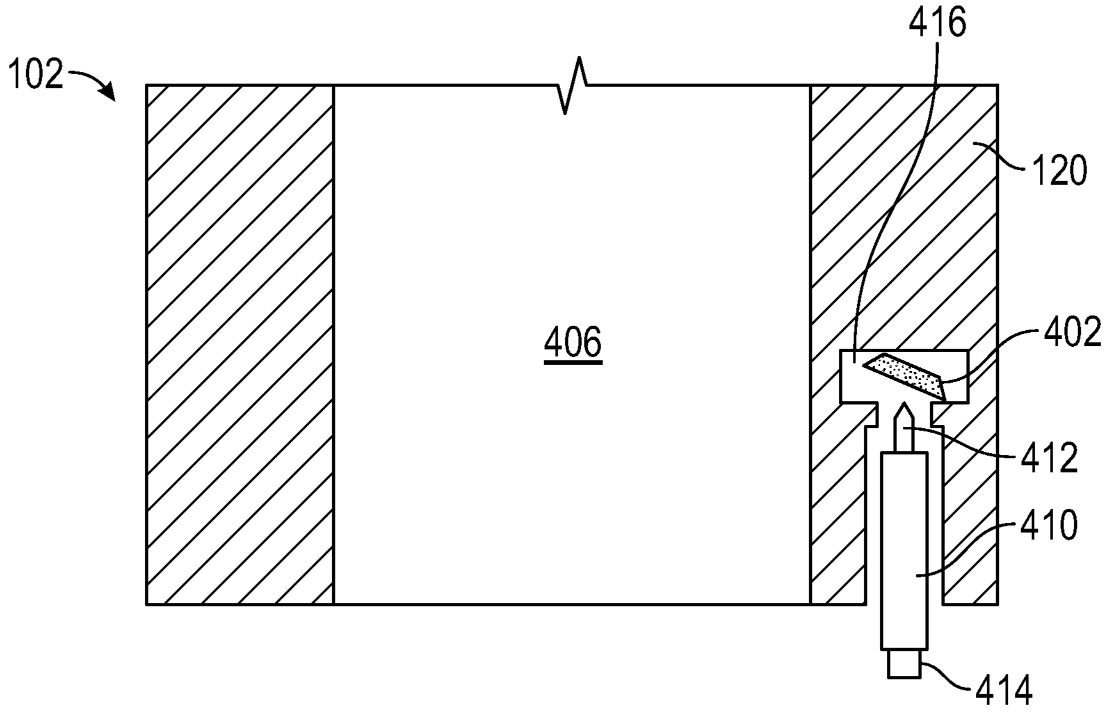

FIGS. 4A and 4B illustrate a different example of mechanical physical indicator that includes a removable insert 402. The removable insert 402 is attached to a support 404 provided in the annular refill container housing 120 of the refill container 102. The annular refill container housing 120 is provided around an inner space 406 of the refill container 102. The inner space 406 can store a print material that is to be delivered to a printing device.

An engagement member receiving space 408 is defined in the annular refill container housing 120. In other examples, the engagement member receiving space 408 can be defined in a refill container housing of a different shape. The engagement member receiving space 408 is to receive an engagement member 410 of a printing device refill interface. For example, the engagement member 410 can be in the form of a punch element with a tip portion 412 that is engageable with the removable insert 402 (FIG. 4B) to cause the removable insert 402 to be detached from the support 404.

In some examples, a sensor 414 (e.g., a mechanical sensor such as a force transducer or an accelerometer) is attached to the engagement member 410 to detect a force imparted on the engagement member 410. If the removable insert 402 is attached to the support 404 (FIG. 4A), then the sensor 414 detects a first force. However, if the removable insert 402 is detached from the support 404 (FIG. 4B), then the sensor 414 detects a second force that is less than the first force. Detection of the first force indicates that the refill container 102 is unused, whereas detection of the second force indicates that the refill container 102 has been used.

The annular refill container housing 120 also defines a capture chamber 416 into which the removable insert 402 is received once detached from the support 404. Thus, once the removable insert 402 is detached from the support 404, if a user were to shake the refill container 102 back and forth, the user will hear a rattling sound, which provides an audible indication to the user that the refill container 102 was previously used. If the removable insert 402 remains attached to the support 404, then there would be no rattling sound; the absence of this rattling sound is an indication to the user that the refill container 102 was not previously used.

Note that the removable insert 402 in the capture chamber 416 can also provide a tactile indicator to the user, since the force imparted by the removable insert 402 on the housing 120 as the removable insert 402 bounces around in the capture chamber 416 can be felt by the user's hands.

Figure 5:
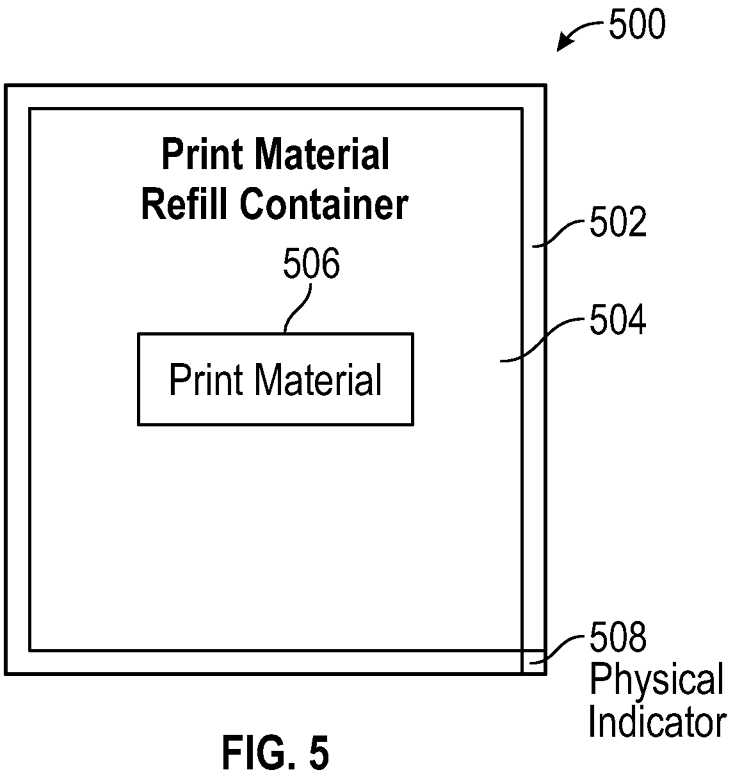
FIG. 5 is a block diagram of a print material refill container according to some examples.

FIG. 5 is a block diagram of a print material refill container 500 according to some examples. The print material refill container 500 includes a housing 502 and a chamber 504 within the housing 502. The chamber 504 contains a print material 506 to be delivered to a printing device when the print material refill container 500 is engaged with the printing device and actuated.

The print material refill container 500 includes a physical indicator 508 subject to modification based on an engagement of the physical indicator 508 with an engagement member of the printing device when the print material refill container 500 engages a refill interface of the printing device to deliver the print material 506 to a reservoir of the printing device.

The physical indicator 508 indicates an unused condition of the print material refill container 500 when the physical indicator 508 has a first state prior to the modification, and the physical indicator 508 indicates a used condition of the print material refill container 500 when the physical indicator 508 has a different second state subsequent to the modification.

In some examples, the print material refill container 500 is without any memory device to store information of the print material refill container 500.

In some examples, the physical indicator 508 includes a layer on a surface of the housing 502, the layer having a first signal characteristic different from a second signal characteristic of the surface of the housing 502. For example, the first signal characteristic can include a first signal reflectance (e.g., optical reflectance of the layer to light or reflectance of the layer to another type of signal), and the second signal characteristic can include a second signal reflectance different from the first signal reflectance. As another example, the first signal characteristic can include a first signal transmittance (e.g., optical transmittance of the layer to light or reflectance of the layer to another type of signal), and the second signal characteristic can include a second signal transmittance different from the first signal transmittance.

In some examples, the physical indicator 508 can include a displaceable member (e.g., the removable insert 304 of FIGS. 3C-3D or the removable insert 402 of FIGS. 4A-4B) that is displaced upon engagement with the engagement member of the printing device. The displaceable member is attached to the housing 502 in the first state, and is (partially or completely) detached from the housing 502 in the second state.

In some examples, the housing 502 includes a space (e.g., 416 in FIGS. 4A-4B) to receive the detached displaceable member and to hold the detached displaceable member within the space.

In some examples, the physical indicator 508 provides any or a combination of: a visual indicator (e.g., FIG. 3B) of the used condition or the unused condition of the print material refill container, or an audible indicator (e.g., FIGS. 4A-4B) of the used condition or the unused condition of the print material refill container, or a tactile indicator (e.g., FIGS. 4A-4B) of the used condition or the unused condition of the print material refill container.

Figure 6:
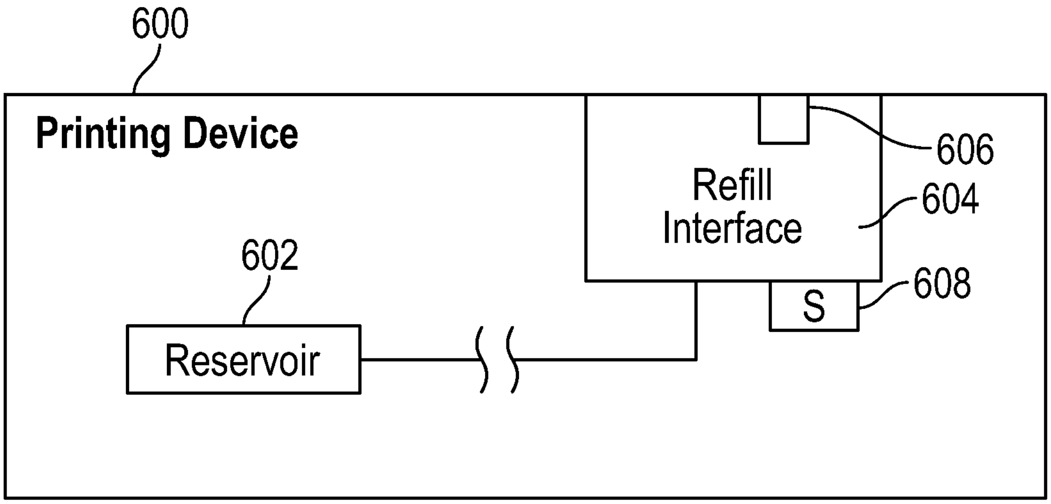
FIG. 6 is a block diagram of a printing device according to some examples.

FIG. 6 is a block diagram of a printing device 600 according to some examples. The printing device 600 includes a reservoir 602 (e.g., a print cartridge or another type of reservoir) to hold a print material.

The printing device 600 includes a refill interface 604 to receive a print material refill container that includes a physical indicator for indicating a usage condition of the print material refill container.

The refill interface 604 includes an engagement member 606 to engage the physical indicator when the print material refill container engages the refill interface 604 to deliver the print material to the reservoir 602. The physical indicator is subject to modification based on an engagement of the physical indicator with the engagement member 606.

The printing device 600 includes a sensor (S) 608 to detect a state of the physical indicator, where a first state of the physical indicator indicates an unused condition of the print material refill container, and a second state of the physical indicator indicates a used condition of the print material refill container, the second state being different from the first state.

In some examples, the sensor (S) 608 includes a signal sensor (e.g., an optical sensor) to detect a signal characteristic (e.g., an optical reflectance or optical transmittance) of the physical indicator. In other examples the signal sensor can detect other signal characteristics of the physical indicator.

In further examples, the sensor (S) 608 measures a mechanical property (e.g., force, acceleration, etc.) of the physical indicator.

In some examples, the printing device 600 includes a controller to take an action based on an indication that the print material refill container is unauthorized, responsive to the sensor (S) 608 indicating that the physical indicator of the print material refill container is in the second state.

Figure 7:
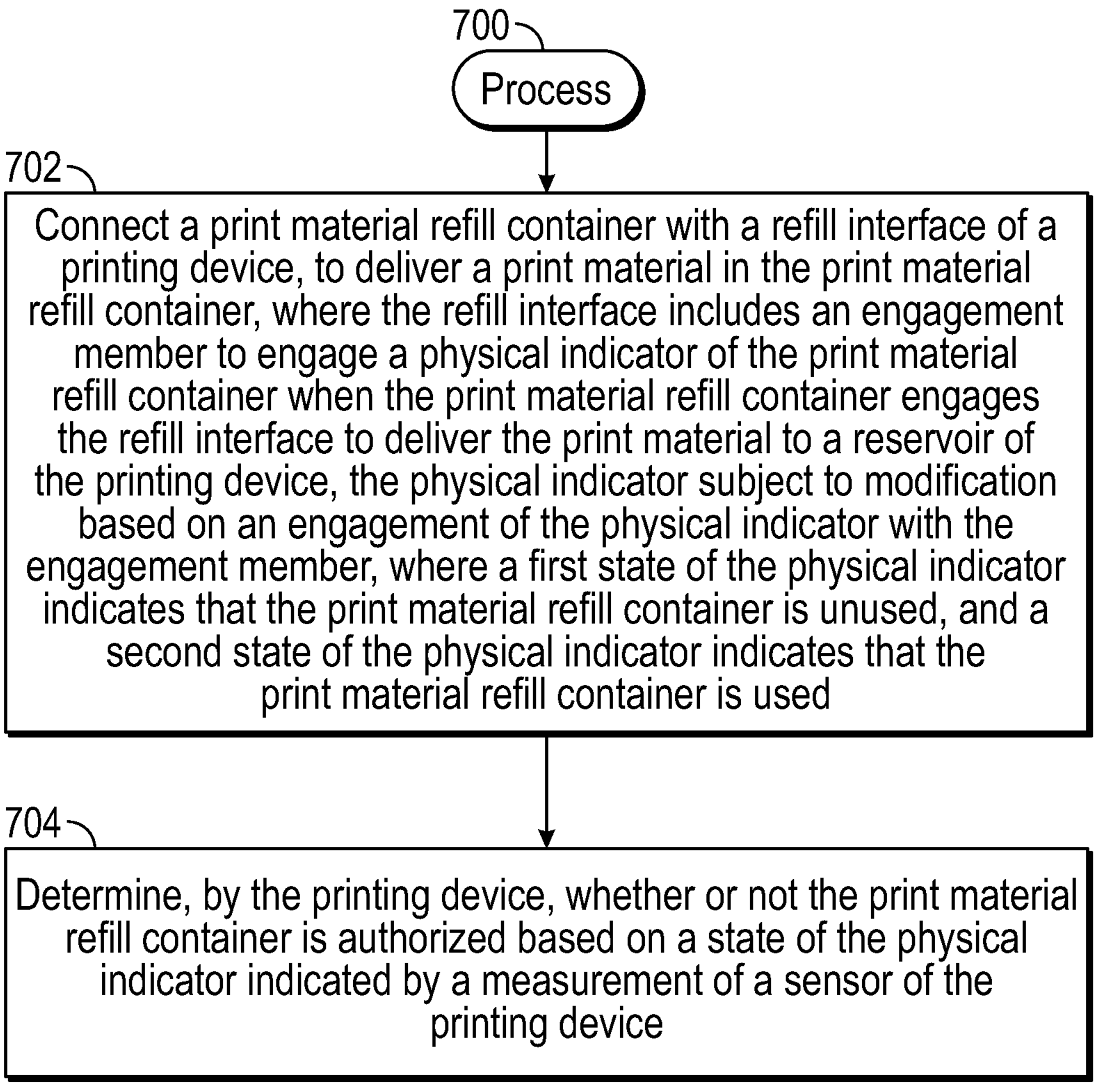
FIG. 7 is a flow diagram of a process according to some examples.

FIG. 7 is a flow diagram of a process 700 according to some examples. The process 700 connects (at 702) a print material refill container with a refill interface of a printing device, to deliver a print material. The refill interface includes an engagement member to engage a physical indicator of the print material refill container when the print material refill container engages the refill interface to deliver the print material to a reservoir of the printing device. The physical indicator is subject to modification based on an engagement of the physical indicator with the engagement member, where a first state of the physical indicator indicates that the print material refill container is unused, and a second state of the physical indicator indicates that the print material refill container is used.

The process 700 includes determining (at 704), by the printing device, whether or not the print material refill container is authorized based on a state of the physical indicator indicated by a measurement of a sensor of the printing device.

If the physical indicator is at the first state prior to the print material refill container connecting to the refill interface, the engagement member changes the state of the physical indicator from the first state to the second state, and the printing device determines that the print material refill container is authorized.

If the physical indicator is at the second state prior to the print material refill container connecting to the refill interface, the printing device determines that the print material refill container is unauthorized.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A print material refill container comprising:

a housing;

a chamber, within the housing, to contain a print material; and a physical indicator subject to modification based on an engagement of the physical indicator with an engagement member of a printing device when the print material refill container engages the printing device to deliver the print material to a reservoir of the printing device, wherein the physical indicator indicates an unused condition of the print material refill container when the physical indicator has a first state prior to the modification, and the physical indicator indicates a used condition of the print material refill container when the physical indicator has a second state subsequent to the modification, wherein the physical indicator comprises a layer on a surface of the housing, the layer having a first signal characteristic different from a second signal characteristic of the surface of the housing.

2. The print material refill container of claim 1, wherein the first signal characteristic comprises a first signal reflectance, and the second signal characteristic comprises a second signal reflectance different from the first signal reflectance.

3. The print material refill container of claim 1, wherein the first signal characteristic comprises a first signal transmittance, and the second signal characteristic comprises a second signal transmittance different from the first signal transmittance.

4. The print material refill container of claim 1, wherein the physical indicator comprises a displaceable member that is displaced upon engagement with the engagement member of the printing device.

5. The print material refill container of claim 4, wherein the displaceable member that is attached to the housing in the first state, and that is detached from the housing in the second state.

6. The print material refill container of claim 5, further comprising a space within the housing, the space to receive the detached displaceable member and to hold the detached displaceable member within the space.

7. The print material refill container of claim 1, wherein the print material refill container is without any memory device to store information of the print material refill container.

8. A print material refill container comprising:

a housing;

a chamber, within the housing, to contain a print material; and a physical indicator subject to modification based on an engagement of the physical indicator with an engagement member of a printing device when the print material refill container engages the printing device to deliver the print material to a reservoir of the printing device, wherein the physical indicator indicates an unused condition of the print material refill container when the physical indicator has a first state prior to the modification, and the physical indicator indicates a used condition of the print material refill container when the physical indicator has a second state subsequent to the modification, wherein the physical indicator provides any or a combination of:

an audible indicator of the used condition or the unused condition of the print material refill container, or a tactile indicator of the used condition or the unused condition of the print material refill container.

9. A printing device comprising:

a reservoir to hold a print material;

a refill interface to receive a print material refill container that comprises a physical indicator for indicating a usage condition of the print material refill container, wherein the refill interface comprises an engagement member to engage the physical indicator when the print material refill container engages the refill interface to deliver the print material to the reservoir, the physical indicator subject to modification based on an engagement of the physical indicator with the engagement member; and a sensor to detect a state of the physical indicator, wherein a first state of the physical indicator indicates an unused condition of the print material refill container, and a second state of the physical indicator indicates a used condition of the print material refill container, the second state being different from the first state, wherein the sensor is to measure a mechanical property of the physical indicator.

10. The printing device of claim 9, wherein the sensor comprises a signal sensor to detect a signal characteristic of the physical indicator.

11. The printing device of claim 9, further comprising:

a controller to take an action based on an indication that the print material refill container is unauthorized, responsive to the sensor indicating that the physical indicator of the print material refill container is in the second state.

12. A method comprising:

connecting a print material refill container with a refill interface of a printing device, to deliver a print material in the print material refill container, wherein the refill interface comprises an engagement member to engage a physical indicator of the print material refill container when the print material refill container engages the refill interface to deliver the print material to a reservoir of the printing device, the physical indicator subject to modification based on an engagement of the physical indicator with the engagement member, wherein a first state of the physical indicator indicates that the print material refill container is unused, and a second state of the physical indicator indicating that the print material refill container is used; and determining, by the printing device, whether or not the print material refill container is authorized based on a state of the physical indicator indicated by a measurement of a sensor of the printing device, wherein the sensor is to measure a mechanical property of the physical indicator.

13. The method of claim 12, wherein if the physical indicator is at the first state prior to the print material refill container connecting to the refill interface:

the engagement member changes the state of the physical indicator from the first state to the second state, and the printing device determines that the print material refill container is authorized, and wherein if the physical indicator is at the second state prior to the print material refill container connecting to the refill interface:

the printing device determines that the print material refill container is unauthorized.

* * * * *